(12) United States Patent
Capdevilla et al.

(10) Patent No.: US 6,638,202 B2
(45) Date of Patent: Oct. 28, 2003

(54) BAG TURNING DEVICE

(75) Inventors: Eduard Capdevilla, Terrasa (ES); Francesc Pineda, Granollers (ES); Xavi Codina, Navarcles (ES); Fracisco Reollo, Terrassa (ES); Eduard Guitart, Barcelona (ES)

(73) Assignee: Autotex, SA, Terrassa (ES)

( * ) Notice: Subject to any disclaimer, the term of this patent is extended or adjusted under 35 U.S.C. 154(b) by 0 days.

(21) Appl. No.: 10/126,644

(22) Filed: Apr. 19, 2002

(65) Prior Publication Data

US 2002/0177515 A1 Nov. 28, 2002

Related U.S. Application Data

(60) Provisional application No. 60/285,565, filed on Apr. 20, 2001.

(51) Int. Cl.$^7$ .............................. B31F 1/00; A41H 43/02
(52) U.S. Cl. .......................... 493/449; 223/1; 223/39; 449/416; 449/417; 449/418; 449/419; 449/420; 449/450; 449/459
(58) Field of Search ................................ 493/449, 416, 493/417, 418, 419, 420, 446, 450, 459, 101, 123; 223/39, 1

(56) References Cited

U.S. PATENT DOCUMENTS

| 3,371,828 A | 3/1968 | Elsas | 223/43 |
|---|---|---|---|
| 5,127,558 A | 7/1992 | Paolo | 223/40 |
| 5,690,358 A | * 11/1997 | Marotzke | 280/743.1 |
| 5,707,711 A | 1/1998 | Kitamura | 428/193 |
| 5,791,532 A | * 8/1998 | Roehl et al. | 223/39 |
| 5,884,574 A | 3/1999 | Sogi et al. | 112/441 |
| 6,171,228 B1 | * 1/2001 | Marotzke et al. | 493/405 |
| 6,196,960 B1 | * 3/2001 | Owensby | 493/220 |
| 6,260,330 B1 | * 7/2001 | Borowski et al. | 53/429 |
| 6,327,838 B1 | * 12/2001 | Maul et al. | 53/429 |
| 6,532,716 B1 | * 3/2003 | Weis | 53/258 |

* cited by examiner

*Primary Examiner*—Rinaldi I. Rada
*Assistant Examiner*—Gloria R Weeks
(74) *Attorney, Agent, or Firm*—Terry T. Moyer; Jeffery E. Bacon

(57) ABSTRACT

An inverting cone mounted to an expansion box for turning a bag assembly having an assembly opening, an assembly extended length, and an assembly width. The inverting cone has an inlet separated from an outlet by a length. The inverting cone inlet is smaller than the assembly opening of the bag assembly, the inverting cone length is longer than the extended length of the bag assembly, and the cross-sectional area of the inverting cone increases from the inlet to the outlet along the length of the inverting cone. The expansion box has an expansion chamber separated from a manifold chamber by a baffle plate, and the baffle plate includes concentric circles of apertures communicating between the expansion chamber and the manifold chamber. The outlet of the inverting cone is open to the expansion chamber opposite to the center of the concentric circles of apertures in the baffle plate, and the side walls of the expansion box as spaced further apart than the assembly width of the bag assembly.

7 Claims, 9 Drawing Sheets

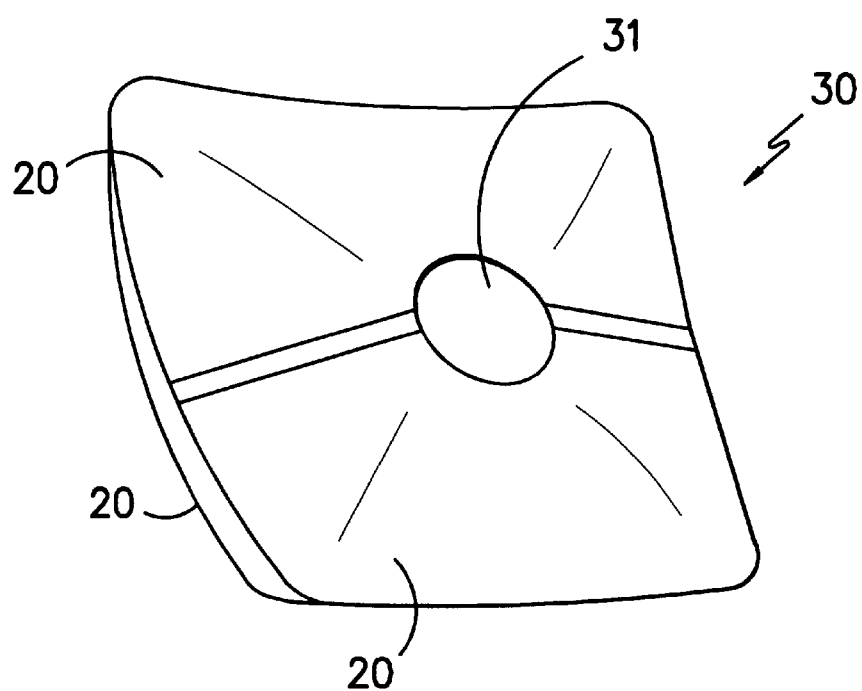
FIG. -1A-
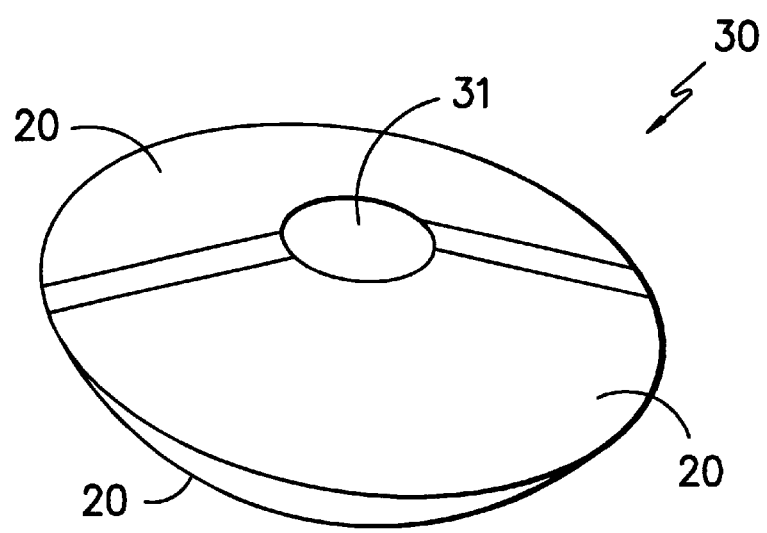
FIG. -1B-

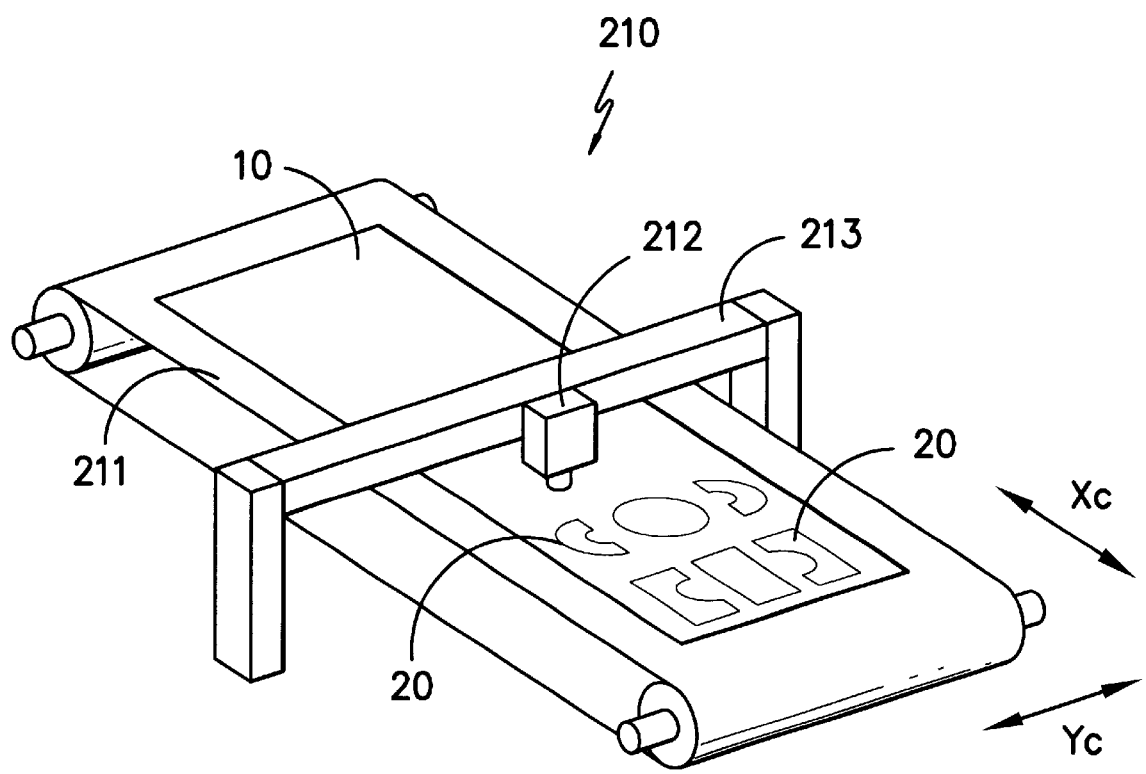
FIG. -2-

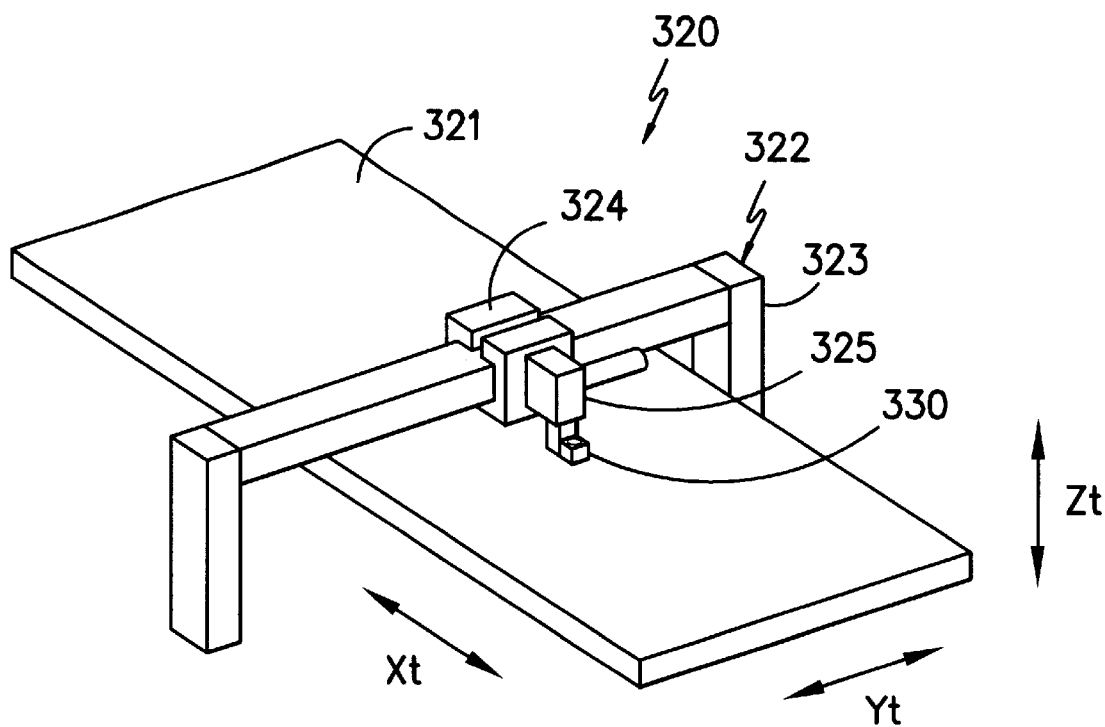
FIG. -3A-
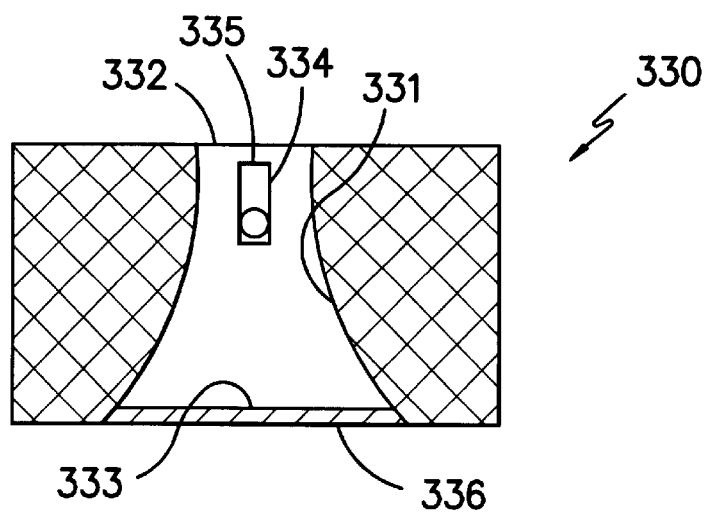
FIG. -3B-

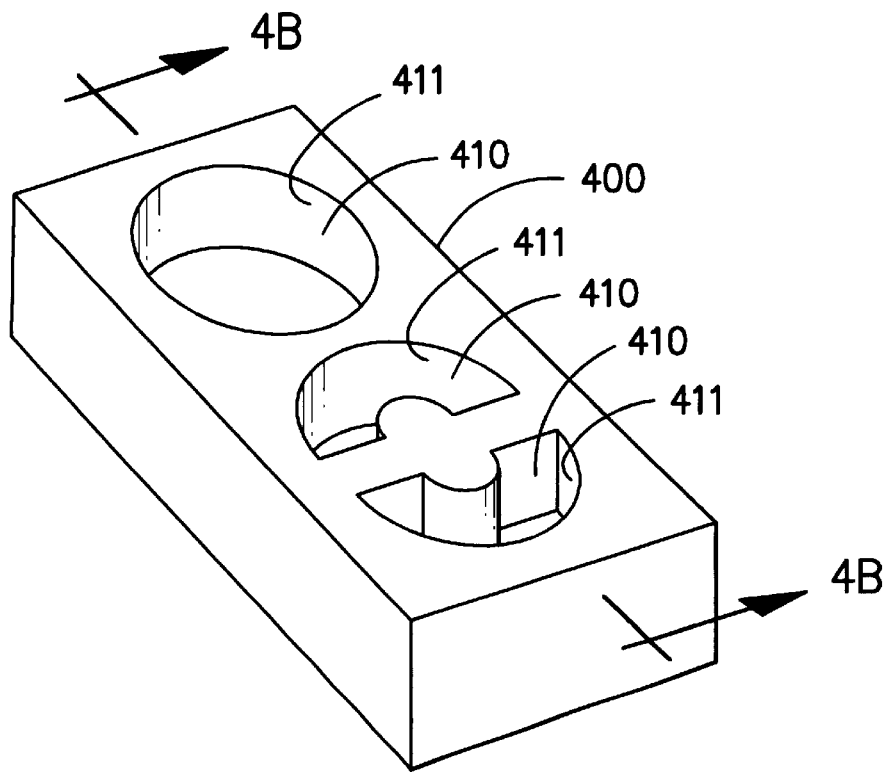
FIG. —4A—
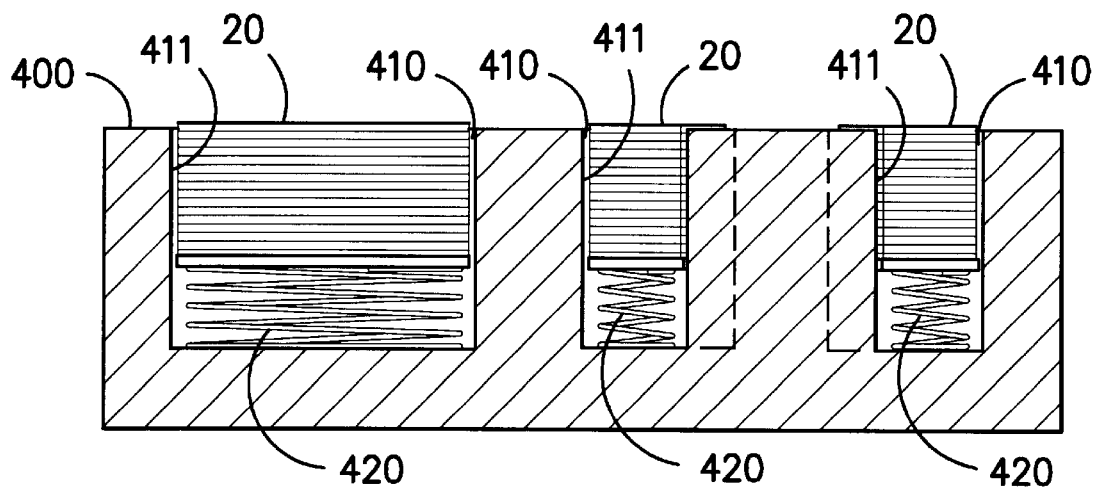
FIG. —4B—

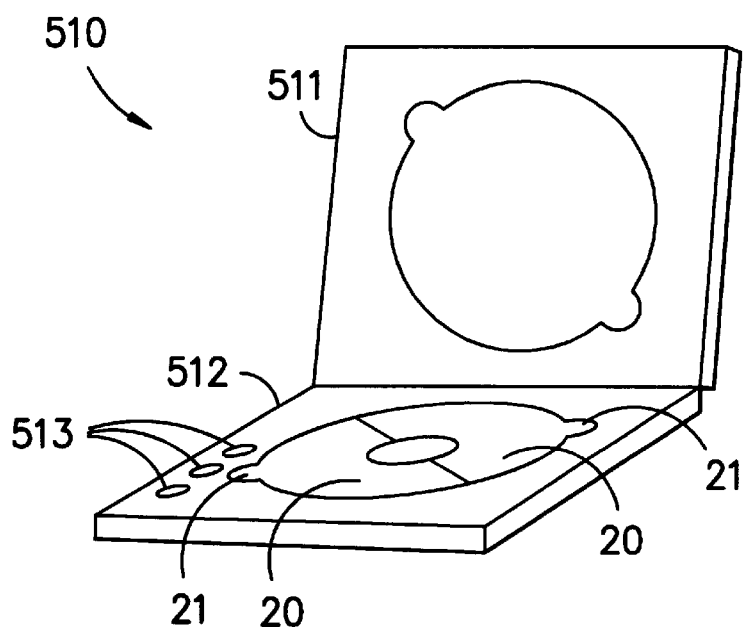
FIG. -5A-
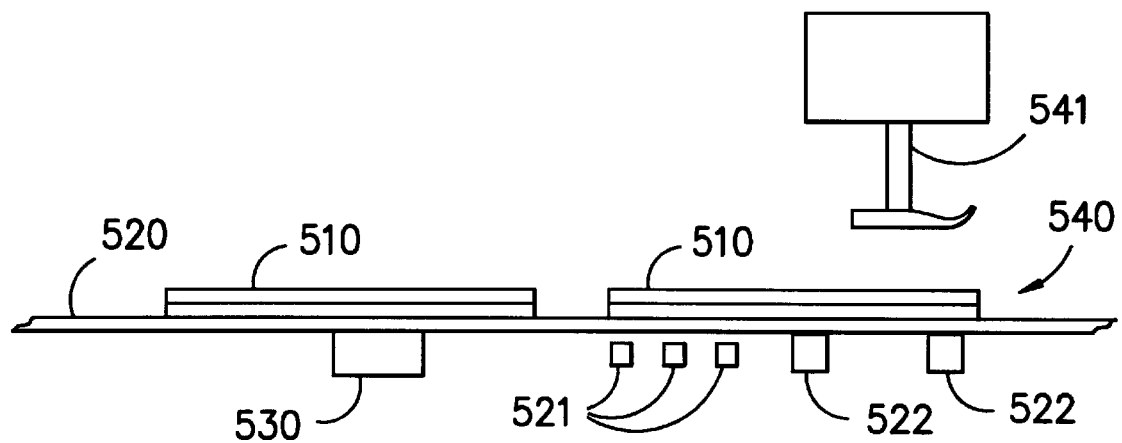
FIG. -5B-

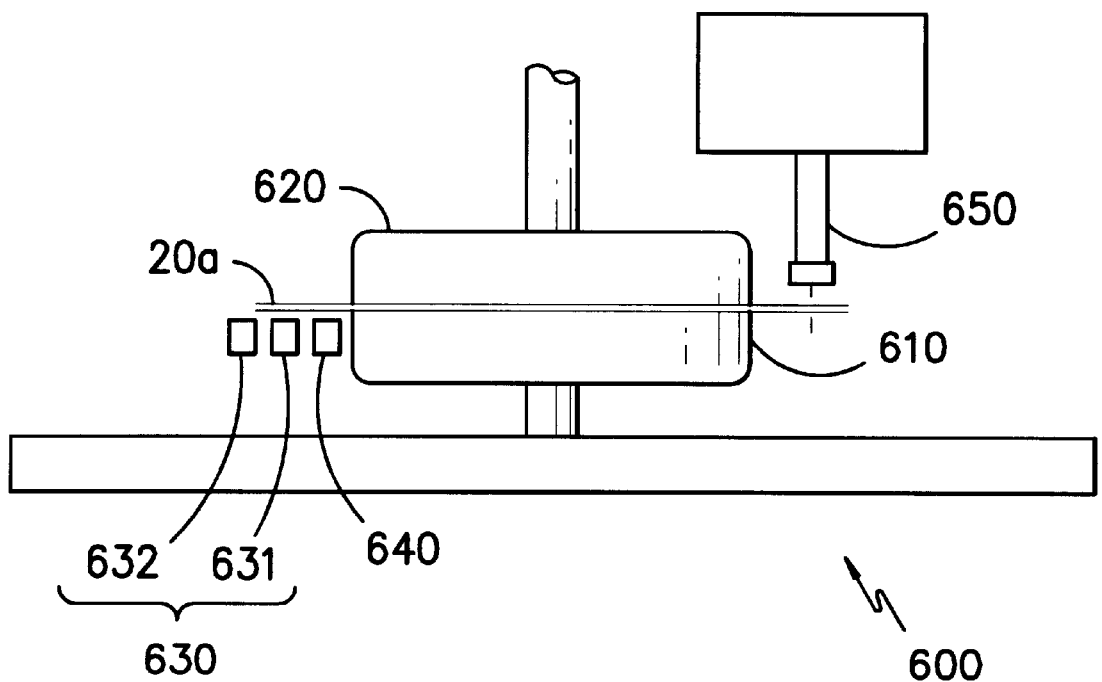
FIG. —6—

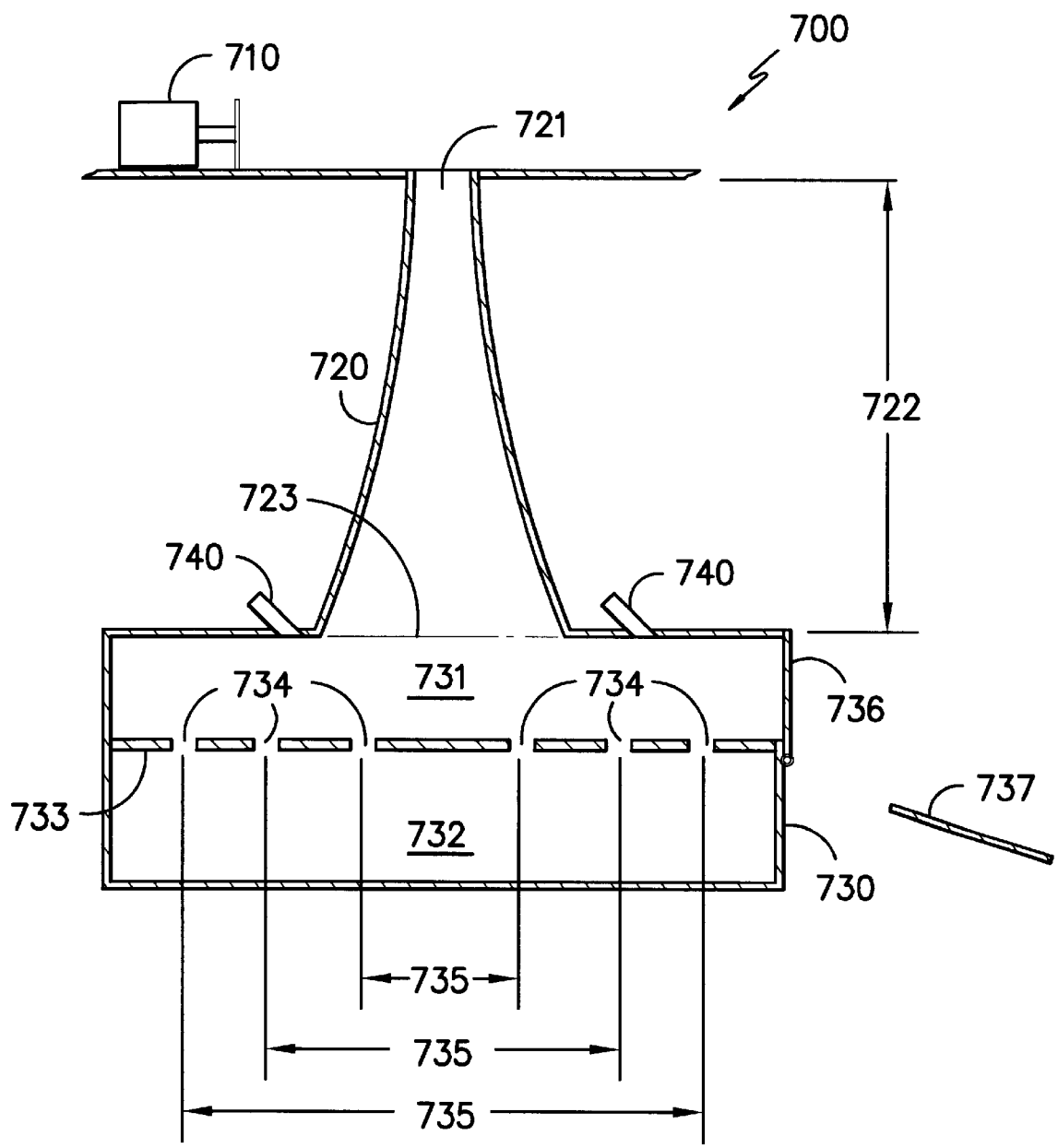
FIG. —7A—

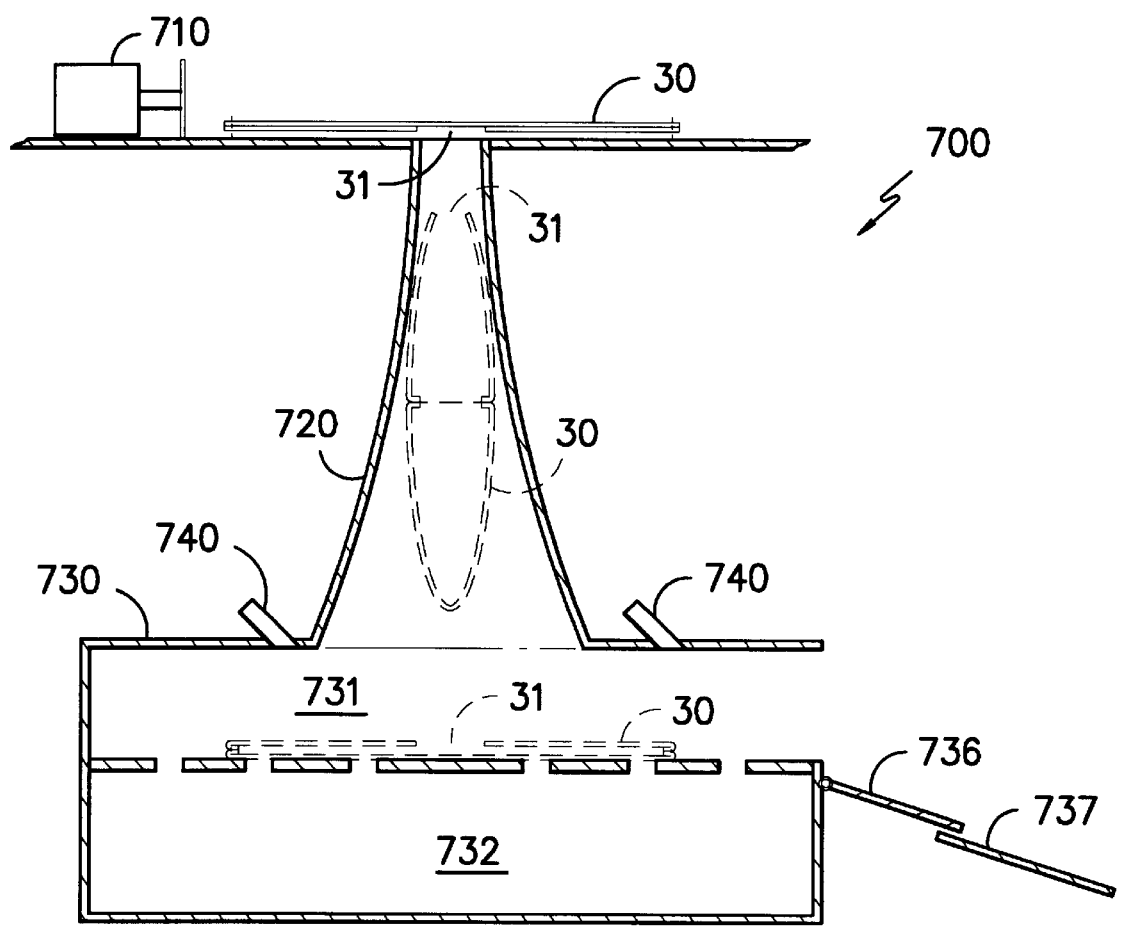
FIG. -7B-

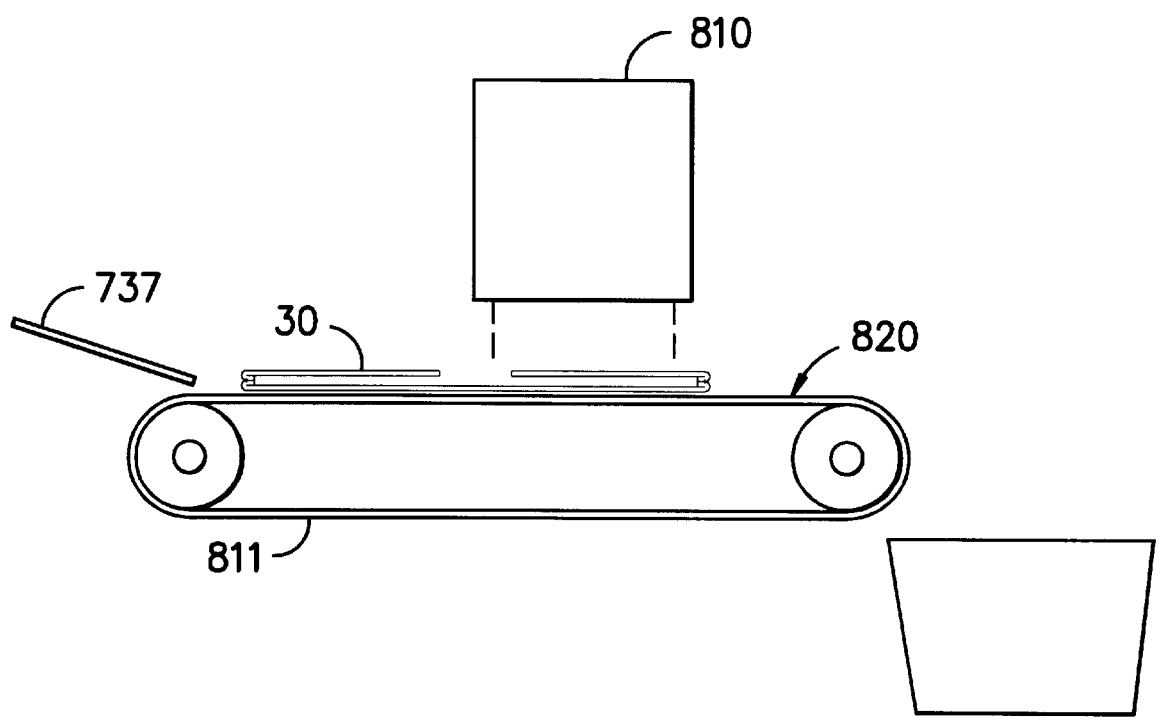
FIG. -8-

BAG TURNING DEVICE

This application claims benefit of Provisional No. 60/285,565 filed Apr. 20, 2001.

BACKGROUND

Bag assemblies, such as air bags, are typically formed of multiple component parts. However, the process of forming the bag assemblies requires much manual work. Therefore, there is a need for methods and apparatuses that can reduce the manual work required in forming a bag assembly from multiple components.

BRIEF DESCRIPTION OF THE DRAWINGS

The present invention can be better understood with reference to the Detailed Description below in combination with the following Drawings:

FIG. 1A is a perspective view of one embodiment of a bag assembly formed by the present invention.

FIG. 1B is a perspective view of another embodiment of a bag assembly formed by the present invention.

FIG. 2 is a diagram illustrating a laser cutting table.

FIG. 3A is a diagram illustrating a 3-way transfer device.

FIG. 3B is a cross-sectional view illustrating an accelerator pick-up device for use as one embodiment of a pick-up device in the 3-way transfer device of FIG. 3A.

FIG. 4A is a perspective view illustrating a loading station platform.

FIG. 4B is a cross-sectional view of the loading station platform from FIG. 4A, with component parts therein.

FIG. 5A is a perspective view illustrating a sewing frame.

FIG. 5B is a diagram illustrating the frame from FIG. 5A at a layer detector and a sewing and cutting area.

FIG. 6 is a diagram illustrating a diagram illustrating a circular sewing device.

FIG. 7A is a diagram illustrating a turning device of the present invention.

FIG. 7B is a cross-sectional view of the turning device of FIG. 7A, illustrating the passage of a bag assembly therethrough.

FIG. 8 is a diagram illustrating a metal detector.

DETAILED DESCRIPTION

Referring now to the figures, and in particular to FIGS. 1A and 1B, there is show a bag assembly 30 formed of component parts 20.

In one embodiment of the present invention, the component parts 20 are formed on a laser cutting table 210, as illustrated in FIG. 2. The laser cutting table 210 includes a conveyor belt 211, a laser 212, and a laser carriage 213. Layer(s) of fabric and/or plastic film 10 are rolled onto the conveyor belt 211. The laser 212 is used to cut the fabric and/or plastic film 10. The conveyor belt 211 moves the fabric and/or plastic film 10 in a $X_C$ direction under the laser 212, and the laser 212 is mounted on a carriage 213 that moves the laser 212 in a $Y_C$ direction. The movement of the conveyor belt 211 and the laser carriage 213 are coordinated to cut the various component parts 20 out of the layers of fabric and/or plastic film 10.

The cut component parts 20 are separated from the remnant fabric and/or plastic film 10, and are positioned to be picked up for transfer and consolidation into like groups of component parts 20. The pickup, transfer, and consolidation can be done by a robot, a 3-way transfer device, or other devices or methods. Movements of the robot, 3-way transfer device, or other device or method, can be coordinated to perform the pickup, transfer, and consolidation by a computer or other electronic controller.

A 3-way transfer device 320 is illustrated in FIGS. 3A and 3B that can be used in the present invention. The 3-way transfer device 320 includes an X-platform 321 and an Y-Z carriage 322. The X-platform 322 is a moveable table or belt that provides movement in the XT direction. The Y-Z carriage 322 includes a carriage guide 323, a transfer carriage 324, a lifting device 325, and a pick-up device 330. The carriage guide 323 extends over the X-platform 321 in the $Y_T$ direction, which is perpendicular to the $X_T$ direction of the X-platform 321. The transfer carriage 324 moves in the $Y_T$ direction along the carriage guide 323. The lifting device 325 is mounted to the carriage guide 324 and has the pick-up device 330 mounted to an end of the lifting device 325. The lifting device 325 moves the pick-up device 330 up and down in the $Z_T$ direction, which is perpendicular to the $X_T$ direction and the $Y_T$ direction.

The pick-up device 330 is adapted to secure one or more of the particular component part(s) 20 for movement of the particular component part(s) 20. In one embodiment, the pick-up device 330 is an accelerator pick-up device which uses pneumatic pressure to secure the component part(s) 20, such as a coval device. The accelerator pick-up device 330 of the present invention includes a venturi 331, an air supply tube 334, and a screen 336. The air supply tube 334 is positioned inside the venturi 331 with the supply tube exit 335 directed towards the smaller diameter 332 of the venturi 331. Pressurized air is directed through the air supply tube 334 and exits toward the small diameter 332 of the venturi 331. The speed of the pressurized air through the venturi 331 lowers the pressure at the small end 332 of the venturi 331. The low pressure at the small end 332 of the venturi 331 amplifies a vacuum at the larger open end 333 of the venturi 331. The amplified vacuum at the larger open end 333 of the venturi 331 is used to secure the particular component part(s) 20. Accelerator pick-up devices, such as the coval device, are typically used to secure rigid articles. Flexible articles, such as the component parts 20 of the present invention formed from fabric and/or plastic film 10, can be drawn into the venturi 331 of an accelerator pick-up device 330. To prevent drawing the particular component part(s) 20 into the venturi 331, the screen 336 is positioned over the larger open end 333 of the venturi 334. The accelerator pick-up device has the advantage that only pressurized air is necessary to operate the pick-up device. Although the present invention has been explained with the use to an accelerator pick-up device as the pick-up device 330, it is contemplated by the present invention that other pick-up devices that are capable of securing one and/or more component parts 20 can be used in place of the accelerator pick-up device 330 as described herein.

Component parts 20 are consolidated into loading station platforms, such as the loading station platforms 400 in FIGS. 4A and 4B. The component parts 20 can be loaded directly into the loading station platforms 400, or can be placed in a staging area prior to loading into the loading station platforms 400. Each loading station platform 400 holds a series of a particular component part 20. The particular component parts 20 at each station 400 must all be aligned in the same orientation. To keep the component parts 20 aligned, the loading station platforms 400 can have recesses 410 with side walls 411 that contour with the silhouette of the component part 20. A self adjusting lift 420 of the loading station platforms 400 positions the series of component parts 20 with the top component part 20 always at the same selected height. In this manner, the component parts 20 at each different station 400 will have the same height, allowing the loading station platform 400 to position a different station of component parts 20 at standard height and location for pick up. In one embodiment, the loading station platform 400 can also be the X-movement platform of a 3-way transfer device, such as the 3-way transfer device 220 illustrated in FIGS. 2A and 2B. In another embodiment, the loading station platform can merely be a presentation table or a part of another component in the process of forming the component parts 20.

The component parts 20 from the loading station platforms 400 are placed into a sewing frame, such as the sewing frame 510 illustrated in FIGS. 5A and 5B. The sewing frames 510 have a top frame member 511 and a bottom frame member 512. The sewing frames 510 are designed to combine particular component parts 20, and different combination of component parts 20 can be combined with different sewing frames 510. The sewing frames 510 also include frame indicators 513 that indicate which component parts 20 the sewing frame 510 will assemble. The bottom frame member 512 rests on a table 520 with frame sensors 521 that detect the frame indicators 513 to insure that the correct sewing frame 510 will be used to assemble the desired combination of component parts 20. The component parts 20 have tabs 21 which are detected through the sewing frame 510 by component sensors 522 in the table 520. The sensors 521 and 522 detect both if the correct component parts 20 have been loaded in the frame, and if the particular component parts 20 are correctly positioned in the frame 510. After the component parts 20 have been positioned in the bottom frame member 512, the top frame member 511 is positioned on the bottom frame member 512, and the two frame members 511 and 512 are secured together holding the component parts 20 in position. In one embodiment, the top frame member 511 and the bottom frame member 512 are secured together by a force device such as electromagnets or the like.

The secured sewing frame 510 and component part(s) 20 are moved to a layer detector 530, and then to a sewing and cutting area 540, such as illustrated in FIG. 5B. The layer detector 530 insures that the correct number of layers of component parts 20 are present in the sewing frame 510. In the sewing and cutting area 540, an automated sewing machine 541 sews the component parts 20 together an assembly 30. If the assembly 30 requires additional component parts 20, the frame 510 can be positioned at a second station for removing a frame member 511 or 512, loading the additional component parts 20, and securing frame top and bottom frame members 511 and 512 together, which is then moved through the layer detector 530 to detect if the proper amount of layers are present, and then to the sewing and cutting area 540 where the components 20 are sewn together. Once the assembly 30 is complete, frame 510 and assembly 30, and the top frame member 511 is removed and the assembly 30 is removed from the bottom frame member 512.

For the construction of certain circular air bags, such as circular air bags used in the steering wheel of the driver's side of an automobile, the assembly 30 must also include an additional component part or parts 20a which is added at a circular sewing device, such as the circular sewing device 600 illustrated in FIG. 6. The circular sewing device 600 includes a spindle 610, a spindle cover 620, a sewing head 630, an edge detector 640, and a layer detector 640. The component parts 20 sewn together in the frame 510 are transferred to the spindle 610 with the additional component part(s) 20a. The sewn together component parts 20 and the additional component part(s) 20 can be transferred to the spindle 610 by a robot, 3-way transfer device, or other device or method. In one embodiment, the same transfer device is used that was used to transfer parts to the frame member 510. The spindle cover 620 presses down on the component parts 20 to secure the component parts 20 to the spindle 610. The edge detector 630 has an inside sensor 631 and an outside sensor 632. As the component parts 20 are rotated on the spindle 610, the edge detector 630 checks for alignment of the various component parts 20 on the spindle 610 by requiring those parts to always cover the inside sensor 631, and never cover the outside sensor 632. Also, as the spindle 610 rotates, the layer detector 640 monitors the component parts 20 to insure that the correct number of component parts 20 are present on the spindle 610, and that none of the layers of the component parts 20 are folded over. The component parts 20 are rotated on the spindle 610 while the sewing head 630 sews the component parts 20 together at the periphery to form the assembly 30. Once the sewing head 640 has completed the sewing operation, the spindle cover 630 is removed to allow access to the assembly 30.

The stitches sewn into the component parts 20 can be inspected by an artificial vision checking system to determine if the stitches match the appearance of the stitches in a pre-selected pattern. The artificial vision checking system can perform the check after all of the stitches have been made in the component parts 20 to form the assembly 30, or during the process of sewing perform a check on the stitches that have been formed in the component parts 20.

The assemblies 30 formed above typically must be turned inside-out to form an air bag with the free ends of the component parts 20 disposed inside of the air bag. A turning device can be used to turn the assemblies 30 inside-out, such as the turning device 700 illustrated in FIGS. 7A and 7B. The assemblies 30 can be transferred to the turning device 700 by a robot, 3-way transfer device, or other device or method.

The turning device 700 generally includes a positioning arm 710, an inverting cone 720, an expansion box 730, and ejection jets 740. The positioning arm 710 is an arm that extends laterally to position the air bag 30 over the inverting cone 720. The positioning arm 710 can actuate with pneumatics, electronics, or any suitable method of causing linear motion.

The inverting cone 720 has an inlet 721 smaller than the opening 31 in the newly formed bag assembly 30. The cross sectional area of the inverting cone 740 increases along the length 722 of the inverting cone 740 to an outlet 723. The length 722 of the inverting cone 720 is slightly longer than the stretched out length of the formed bag assembly 30. In this manner, the bag assembly 30 will be fully turned inside to outside before the bag assembly exits the inverting cone 720, as explained below. The outlet 723 of the inverting cone 720 is centered in the top of the expansion box 730.

The expansion box 730 has an expansion chamber 731 and a manifold chamber 732 separated by a baffle plate 733. The expansion chamber 731 forms the top portion of the expansion box 730, and the manifold chamber 732 forms the bottom of the expansion box 730. The baffle plate 733 forms the bottom of the expansion chamber 731 and the top of the manifold chamber 732. Apertures 734 in the baffle plate 733 communicate between the expansion chamber 731 and the manifold chamber 732. The apertures 734 in the baffle plate 733 are positioned in a pattern of concentric circles 735. The aperture area of each concentric circle 735 is larger than the aperture area of the concentric circle 735 immediately inside that particular concentric circle 735. The outlet 723 of the inverting cone 720 is located in the top of the expansion box 730, is open to the expansion chamber 731, and is positioned opposite to the center of the concentric circles 735 of apertures 734 in the baffle plate 733. The expansion box 730 is positioned horizontally with the side walls of the expansion box 730 being separated sufficiently to accommodate the expanded flat bag 30. One side wall of the expansion chamber 730 is an exit door 736 leading from the expansion chamber 731 to an exit ramp 737.

The ejection jets 740 are located in the lower portion of the inverting cone 720, or top portion of the expansion chamber 731. The ejection jets 740 are positioned to direct air downward toward the baffle plate 733 and in the direction of the exit door 736 in the expansion box 730.

In operation, the positioning arm 710 locates the bag assembly 30 over the inlet 721 of the inverting cone 720 such that the inlet 721 is aligned within an opening 31 in the bag assembly 30. A vacuum is then applied to the manifold chamber 732 of the expansion box 730, creating a vacuum in the expansion chamber 731 and the inverting cone 720. The vacuum in the inversion cone 720 draws the material of the bag assembly 30 through the opening 31 in the bag assembly 30 and down the inverting cone 720. After all of the material of the bag assembly 30 has been drawn through the opening 31 in the bag assembly 30, the bag assembly 30 is turned inside-out and enters the expansion chamber 731. The larger aperture areas in the outer concentric patterns 735 draw the outside edges of the bag assembly 30 towards the side walls of the expansion chamber 731 as the bag assembly 30 moves from the inverting cone 720 into the expansion chamber 731. Once the all of the bag assembly 30 has entered the expansion chamber 731, the vacuum from the manifold chamber 732 draws through the apertures 734 in the baffle plate 733 to position the bag assembly 30 flat against the baffle plate 733.

After the bag assembly 30 has been drawn against the baffle plate 733, the vacuum in the manifold chamber 732 is discontinued, and the exit door 737 in the expansion box 730 is opened. The ejection jets 740 direct pulses of air downward and outward on the bag assembly 30. Because the baffle plate 733 of the expansion box 730 is horizontal, the pulses of air from the ejection jets 740 force the bag assembly 30 out of the expansion chamber 731 through the exit door 737 onto the ramp 735 without disturbing the shape of the bag assembly 30.

The assembled and inverted bag 30 is passed through a metal detector 810 to insure that there is no metal in the bag assembly 30. To pass the bag assembly 30 through the metal detector 810, a short conveyor section 820 receives the bag assembly 30 from the ramp 735 of the inverting device 700 and passes the bag assembly 30 under the metal detector 810. In an embodiment where the bag assembly 30 needs lifted to the level of the detector 810, a lift can be used to bring the detector conveyor belt 811 and bag assembly 20 to the level of the metal detector 810. Alternatively, the detector conveyor belt 811 can be positioned on an incline, with the lower end receiving the bag assembly 30 from the ramp 735 of the inverting device 700, and the bag assembly though the metal detector 800.

The final step is the packing of the bag assemblies in containers. The bags must be located in alternating positions in the container. Placing the bags in the container at alternating positions of the container can be done with a robot, the 3-Way Transfer Device, or some other automated device.

What is claimed is:

1. A turning device for a bag comprising:
   an inverting cone including an inlet separated from an outlet by a length, wherein the cross-sectional area of the inverting cone increases from the inlet to the outlet along the length of the inverting cone
   an expansion box including an expansion chamber separated from a manifold chamber by a baffle plate, wherein the baffle plate includes concentric circles of apertures communicating between the expansion chamber and the manifold chamber, and the outlet of the inverting cone being open to the expansion chamber opposite to the center of the concentric circles of apertures in the baffle plate.

2. The turning device according to claim 1, wherein the apertures in the baffle plate of the expansion box are positioned in concentric circles of apertures.

3. The turning device according to claim 2, wherein the concentric circle of apertures are centered below the outlet of the inverting cone.

4. The turning device according to claim 3, wherein the aperture area of each concentric circle of apertures is larger than the aperture area of the adjacent inner concentric circle of apertures.

5. The turning device according to claim 1, wherein the expansion box further includes a door for access to the expansion chamber.

6. The turning device according to claim 5, further including ejection jets position for directing air downward towards the baffle plate and towards the door.

7. The turning device according to claim 6, wherein the ejection jets direct pulses of air.

* * * * *